Patented Apr. 23, 1946

2,398,773

UNITED STATES PATENT OFFICE 2,398,773

CONVERSION OF HYDROCARBON OILS

Gerald C. Connolly, Baton Rouge, La., assignor to Standard Oil Development Company, a corporation of Delaware No Drawing. Application November 22, 1940, Serial No. 366,705

5 Claims. (Cl. 196—52)

This invention relates to the conversion of hydrocarbon oils and pertains more particularly to a catalyst for cracking said oils and to a method of preparing such catalyst.

The primary object of the present invention is to provide an improved catalyst for cracking hydrocarbon oils.

A further related object of the invention is to provide an improved process for cracking oils wherein the oil is cracked in the presence of an active catalyst.

Other objects and advantages of the invention will be apparent from the more detailed description hereinafter.

I have discovered that catalysts having a high order of activity for converting higher boiling hydrocarbons into lower boiling hydrocarbons consisting principally of alumina and a boron compound may be prepared by treating alumina or an alumina forming compound with boron fluoride or complex boron fluoride salts, such as ammonium boron fluoride, $NH_4BF_4$, or the like.

The catalyst may be prepared by treating alumina with the boron fluoride salts in such manner that the alumina is soaked or wetted with a boron fluoride salt solution. The alumina employed in preparing the present catalyst may consist of any of the commercial grades of alumina, such as the various aluminum oxide ores, such as, for example, bauxite, or it may be an activated alumina, such as that formed by precipitating aluminum hydroxide from sodium aluminate in the preparation of metallic aluminum. A preferred type of alumina is one having a gel structure, and particularly an alumina gel formed by peptizing an alumina or aluminum hydroxide precipitate.

Aluminum hydrates, such as aluminum dihydrate or trihydrate, may also be peptized or partly peptized to form a gel-like structure. The peptization may be accomplished by treating the aluminum precipitate, hydrate, or the like with an organic acid, such as acetic acid, formic acid, chloracetic acid, and the like. This treatment tends to convert the precipitate into a gel-like mass.

The relative proportions of alumina and boron fluoride salts should be controlled so as to form a catalyst having a boron oxide content between 10% and 30% and preferably 15%.

The following examples serve to illustrate the activity of the catalyst prepared according to the invention. It will be understood, however, that the specific method of preparation set forth in the examples is illustrative rather than limitative.

Example 1

A solution of ammonium sulfate is first treated with ammonium hydroxide to form a gelatinous precipitate. The resulting precipitate is then washed substantially free of sulfate ions. The washed product is then transferred to a mechanical mixer and sufficient acetic acid, of from 4% to 16% concentration, is added to give a fluid mix. About 1 liter of acetic acid is normally sufficient to peptize 6 kilograms of washed precipitate. After mixing for about one hour, the product is transferred to a drier and carefully dried at a temperature below 212° F. until dry. The resulting product is then treated with a solution of boron fluoride of a concentration sufficient to form a catalyst in which the boron content calculated as boron oxide is about 10%.

This product is then dried and activated by slowly heating to a temperature of about 850° F. The resulting product is molded and tested for cracking activity by passing an East Texas virgin gas oil of 33.8° A. P. I. gravity in contact with the catalyst at a temperature of 850° F., at a feed rate of 0.6 volumes of liquid oil per volume of catalyst per hour over a two-hour period. Under such conditions about 48% of the feed is converted into gasoline constituents.

Example 2

Another catalyst was prepared as described in Example 1, except that ammonium fluoborate was employed instead of boron fluoride for treating the alumina gel. This product when tested under the conditions stated in Example 1 resulted in a gasoline yield of about 51%.

Example 3

A peptized alumina gel prepared as described in Example 1 was first soaked in a solution containing 5% hydrofluoric acid and then admixed with 15% boric oxide. This product, after drying and activating as before described, produced about 50% gasoline under the test conditions set forth in Example 1.

Example 4

A peptized alumina gel prepared as described in Example 1 was mixed with 15% of boron oxide and then treated with a 5% solution of hydrofluoric acid. This product, after drying and activating, produced 53% gasoline under the test conditions described in Example 1.

From Examples 3 and 4 it will be apparent that highly active catalysts can be prepared by forming the boron fluoride on the alumina.

While the catalyst prepared as above described is particularly desirable for the cracking of hydrocarbon oils or in reactions involving the splitting of hydrocarbon molecules, it also has application to other types of hydrocarbon reactions and particularly for the removal of sulfur compounds therefrom.

Having described the preferred embodiment of the invention, it will be understod that it embraces such other variations and modifications as come within the spirit and scope thereof.

I claim:

1. A method of cracking hydrocarbon oil which comprises passing the oil in the absence of extraneous hydrogen through a cracking zone containing a catalyst comprising alumina as a major constituent and a boron compound as a minor constituent and wherein the alumina is treated with a salt containing boron and fluorine and maintaining said oil in contact with said cracking catalyst at cracking temperature for a period sufficient to obtain the desired cracking thereof.

2. A process for cracking hydrocarbon oil which comprises passing said oil through a cracking zone, contacting said oil within said cracking zone with an active cracking catalyst prepared by first treating an aluminum salt solution with ammonium hydroxide to form a gelatinous precipitate of alumina, thereafter washing the gelatinous precipitate free of soluble salt ions, subsequently treating the washed precipitate with a dilute solution of acetic acid to peptize said precipitate, thereafter treating the peptized precipitate with a salt containing boron and fluorine to form a catalyst containing a major portion of alumina and a minor portion of a boron compound and maintaining said oil in contact with said catalyst at active cracking temperature for a period sufficient to obtain the desired cracking thereof.

3. A process for cracking hydrocarbon oil which comprises passing said oil through a cracking zone in contact with an active cracking catalyst prepared by first treating an aluminum salt solution with ammonium hydroxide to form a gelatinous precipitate of alumina, subsequently washing the gelatinous precipitate to free said precipitate of soluble salt ions, thereafter treating the washed precipitate with a dilute solution of acetic acid to peptize said precipitate, drying said peptized precipitate, thereafter incorporating a boron compound into said alumina to form a catalyst containing a major portion of alumina and a minor portion of said boron compound, treating at least the alumina component of said catalyst with a fluorine compound, and maintaining said oil in contact with said catalyst at an active cracking temperature for a period sufficient to obtain the desired cracking thereof.

4. A process for cracking hydrocarbon oil which comprises passing said oil through a cracking zone in contact with an active cracking catalyst prepared by first treating an aluminum salt solution with ammonium hydroxide to form a gelatinous precipitate of alumina, thereafter washing the gelatinous precipitate to free said precipitate of soluble salt ions, subsequently treating said washed precipitate with a dilute solution of acetic acid to peptize said precipitate, drying the peptized precipitate, treating the peptized precipitate wtih a fluorine compound, thereafter incorporating a boron compound with said peptized alumina to form a catalyst containing a major portion of alumina and a minor portion of said boron compound, and maintaining said oil in contact with said catalyst at active cracking temperature for a period sufficient to obtain the desired cracking thereof.

5. A process for cracking hydrocarbon oil which comprises passing said oil through a cracking zone in contact with an active cracking catalyst prepared by first treating an aluminum salt solution with ammonium hydroxide to form a gelatinous precipitate of alumina, thereafter washing the gelatinous precipitate to free said precipitate of soluble salt ions, subsequently treating the washed precipitate with a dilute solution of acetic acid to peptize said precipitate, drying the peptized precipitate, thereafter incorporating a boron compound with said alumina to form a catalyst containing a major portion of alumina and a minor portion of said boron compound, treating the resulting catalyst with a fluorine compound, and maintaining said oil in contact with said catalyst at active cracking temperature for a period sufficient to obtain the desired cracking thereof.

GERALD C. CONNOLLY.